(12) United States Patent
Hirst

(10) Patent No.: US 10,870,474 B2
(45) Date of Patent: Dec. 22, 2020

(54) DYNAMIC POSITIONING VESSEL WITH A PLURALITY OF REDUNDANCY ZONES

(71) Applicant: Kongsberg Maritime CM AS, Alesund (NO)

(72) Inventor: Mike Hirst, Derby (GB)

(73) Assignee: KONGSBERG MARITIME CM AS, Alesund (NO)

( * ) Notice: Subject to any disclaimer, the term of this patent is extended or adjusted under 35 U.S.C. 154(b) by 44 days.

(21) Appl. No.: 16/439,697

(22) Filed: Jun. 12, 2019

(65) Prior Publication Data

US 2019/0291839 A1 Sep. 26, 2019

Related U.S. Application Data

(63) Continuation of application No. 14/910,677, filed as application No. PCT/NO2014/050137 on Aug. 5, 2014, now abandoned.

(30) Foreign Application Priority Data

Aug. 6, 2013 (NO) .................................... 30131066
Aug. 7, 2013 (GB) .................................... 1314173.4

(51) Int. Cl.
  *B63H 21/17* (2006.01)
  *B63H 23/24* (2006.01)
  (Continued)

(52) U.S. Cl.
  CPC ............. *B63H 21/17* (2013.01); *B63H 23/24* (2013.01); *B63H 25/42* (2013.01); *H02B 1/015* (2013.01);
  (Continued)

(58) Field of Classification Search
  CPC ........ B63H 21/17; B63H 23/24; B63H 25/42; B63H 2025/425; B63B 2241/22; H02B 1/015
  See application file for complete search history.

(56) References Cited

U.S. PATENT DOCUMENTS 4,281,615 A 8/1981 Wilson et al.
6,188,139 B1 * 2/2001 Thaxton ................. B63H 23/24
290/4 R
(Continued)

FOREIGN PATENT DOCUMENTS

EP 2451041 A1 5/2012
GB 2 463 147 A 3/2010
(Continued)

OTHER PUBLICATIONS

DNV-GL Class Guideline CG-0004, "Guidance for safe return to port projects," Det Norske Veritas group, Apr. 2016.
(Continued)

*Primary Examiner* — Ajay Vasudeva
(74) *Attorney, Agent, or Firm* — Hershkovitz & Associates, PLLC; Abe Hershkovitz

(57) ABSTRACT

A high reliability vessel is provided with redundancy zones, and an improved system for a high reliability vessel that overcomes complexities in the prior art and solves the problem of improved reliability. The vessel comprises a plurality of redundancy zones, a thruster system comprising at least two thrusters to create transversal thrust, and a main power supply system comprising a generator system, and a main electrical distribution system comprising a switchboard system. The vessel further comprises an energy storage system comprising a plurality of energy storage subsystems, wherein at least one of the thrusters with an operatively connected energy storage subsystem is located
(Continued)

in a first redundancy zone, and another of the thrusters and the generator system is located outside the first redundancy zone.

19 Claims, 3 Drawing Sheets

(51) Int. Cl.
  *B63H 25/42* (2006.01)
  *H02B 1/015* (2006.01)
(52) U.S. Cl.
  CPC .... *B63B 2241/22* (2013.01); *B63H 2025/425* (2013.01)

(56) References Cited

U.S. PATENT DOCUMENTS

| | | | |
|---|---|---|---|
| 6,247,421 | B1 | 6/2001 | Ludwigson |
| 6,848,382 | B1 | 2/2005 | Bekker |
| 7,429,201 | B2 * | 9/2008 | Rzadki ................. B63G 13/02 440/6 |
| 7,544,108 | B2 | 6/2009 | Rzadki et al. |
| 7,710,081 | B2 | 5/2010 | Saban et al. |
| 7,806,065 | B1 | 10/2010 | Bekker et al. |
| 7,960,948 | B2 | 6/2011 | Saban et al. |
| 8,216,008 | B2 | 7/2012 | Daffey |
| 8,400,010 | B2 | 3/2013 | Blystad et al. |
| 9,413,164 | B2 * | 8/2016 | Hoeven ................. H02H 7/22 |
| 9,543,748 | B2 | 1/2017 | Andersen |
| 2008/0103632 | A1 | 5/2008 | Saban et al. |
| 2010/0244599 | A1 | 9/2010 | Saban et al. |
| 2010/0294189 | A1 | 11/2010 | Frigstad |
| 2013/0313894 | A1 | 11/2013 | Settemsdal |
| 2014/0132064 | A1 | 5/2014 | Kennedy |

FOREIGN PATENT DOCUMENTS

| | | |
|---|---|---|
| WO | WO 00/76840 A1 | 12/2000 |
| WO | WO 2008/023988 A1 | 2/2008 |
| WO | WO 2012/175624 A1 | 12/2012 |
| WO | WO 2013/010577 A1 | 1/2013 |

OTHER PUBLICATIONS

DNV-GL Recommended Practice RP-E306, "Dynamic positioning vessel design philosophy guidelines," Det Norske Veritas group, Jul. 2015.
Dynamic positioning, *Wikipedia*, https://en.wikipedia.org/wiki/Dynamic_positioning, Aug. 6, 2013.
International Search Report in International Application No. PCT/NO2014/050137, dated Aug. 12, 2014.
Written Opinion of the International Search Authority in International Application No. PCT/NO2014/050137, dated Aug. 12, 2014.
Supplementary European Search Report in related European Patent Application No. EP 14 83 4157, dated Jan. 27, 2017.

* cited by examiner

DYNAMIC POSITIONING VESSEL WITH A PLURALITY OF REDUNDANCY ZONES

CROSS-REFERENCE TO RELATED APPLICATIONS

The present application is a Continuation application which claims the benefits of and is based on U.S. application Ser. No. 14/910,677 filed on Feb. 5, 2016, which is a National Stage Application and further claims the benefits of and is based on International Application No. PCT/NO2014/050137 filed on Aug. 5, 2014, the disclosures of which are hereby incorporated by specific reference thereto.

FIELD OF THE INVENTION

The invention relates to high reliability vessels in general, and more specifically, to a system for a dynamic positioning vessel using redundancy zones.

BACKGROUND OF THE INVENTION

From prior art, one should refer to traditional vessels capable of dynamic positioning of the type International Maritime Organization (IMO) Class 3, divided into two redundancy zones by a longitudinal bulkhead. A known problem with such prior art vessels is that flooding or fire in one redundancy zone will render half the vessel inoperative. Also, splitting the engines into two separate engine rooms adds complexity to the vessel design.

Explanations of known regulations, systems and/or components are as follows:

1. Redundancy zones are compartments or sections of a vessel that are allocated to navigation, fire protection, propulsion or other systems/components that are redundant in technical design and are physically separated from each other.

2. Standard fire protection zone Class A60 relates to a fire protection class division with bulkheads and decks which comply with the following criteria:
   (a) they are to be constructed of steel or other equivalent material;
   (b) they are to be suitably stiffened;
   (c) they are to be so constructed as to be capable of preventing the passage of smoke and flame up to the end of the one-hour standard fire test; and
   (d) they are to be insulated with approved non-combustible materials such that the average temperature of the unexposed side will not rise more than 140° C. above the original temperature, nor will the temperature, at any one point, including any joint, rise more than 180° C. above the original temperature, within the times
   Class A-60—60 minutes,
   Class A-30—30 minutes,
   Class A-15—15 minutes, and
   Class A-0—0 minutes.

3. Dynamic positioning is a computer-controlled system of sensors (position, wind, motion, etc.) that allow a vessel to automatically maintain position and heading by using its own propellers and thrusters, or position the ship at a favorable angle towards wind, waves and current, at a fixed position or relative to a moving object.

4. IMO Class 3 vessels include dynamic positioning systems and redundancy zones, and are used during operations where loss of position could cause fatal accidents, severe pollution or damage with major economic consequences. IMO Class 3 vessels usually have multiple redundancy zones and/or systems and A60 fire division equipment because they must withstand fire or flood in any one compartment without the system failing from any single failure, including a completely burnt fire sub division or flooded watertight compartment.

SUMMARY OF THE INVENTION

Therefore, a main objective of the present invention is to provide an improved system for a high reliability vessel that overcomes the above-noted problems.

It is particularly desirable to overcome the problems relating to the lack of flexibility that are present in the solutions known from prior art.

The objectives are achieved according to the invention by a dynamic positioning vessel, including a plurality of redundancy zones, a thruster system comprising at least two thrusters to create transversal thrust, and a main power supply system that includes a generator system, and a main electrical distribution system, including a switchboard system. The vessel further comprises an energy storage system comprising a plurality of energy storage subsystems, wherein at least one of the thrusters with an operatively connected energy storage subsystem is located in a first redundancy zone, and another of the thrusters and the generator system is located outside said first redundancy zone, as described below.

In a first embodiment of the invention, an improved system for a high reliability vessel is provided, comprising a plurality of redundancy zones, a thruster system comprising at least two thrusters to create a transversal thrust, and a main power supply system comprising a generator system, and a main electrical distribution system comprising a switchboard system. The dynamic positioning vessel further comprises an energy storage system which includes a plurality of energy storage subsystems (energy storage is referred to herein as "energy storage system" or "energy storage subsystem"). At least one of the thrusters with an operatively connected energy storage subsystem is located in a first redundancy zone, and another of the thrusters and the generator system are located outside the first redundancy zone.

In one solution, the generator system is centralized in a single compartment. In another solution, the generator system is centralized in a redundancy zone.

In one embodiment of the invention, the energy storage system is centralized. In a further preferred embodiment, the energy storage system is centralized in a redundancy zone.

In another preferred embodiment, the energy storage system comprises a plurality of energy storage subsystems and is decentralized. In a more preferred embodiment, an energy storage subsystem is located locally to at least one thruster. In an even more preferred embodiment, an energy storage subsystem is located locally to all thrusters.

In one embodiment, the switchboard system is centralized. In a more preferred embodiment, the switchboard system is centralized in a redundancy zone.

In another preferred embodiment, the switchboard system comprises a plurality of switchboard subsystems and is decentralized. In a preferred embodiment, the switchboard system is located locally to at least one thruster. In another preferred embodiment, the switchboard system is located locally to at least one energy storage system.

The present invention achieves redundancy without the use of a longitudinal bulkhead in a vessel, and redundancy zones instead can be used around various parts.

These technical effects of the present invention provide, in turn, several further advantages:
- the invention eliminates the need to partition generators into more than one separate generator compartments, thereby reducing complexity and cost of vessel construction;
- redundancy is improved, in that all generators can fail without loss of manoeuvrability;
- bulkheads can be kept small, and thus will not affect the structural properties of the vessel;
- bulkheads do not have to reach all the way up to the deck above, but can be kept lower;
- the switchboard does not have to be split;
- redundancy can exceed that of prior art vessels without added complexity;
- design and structures can be simplified since redundancy zones can group parts having same functionality, e.g., reduced piping for a single generator compartment; and
- maximum dynamic positioning capability is provided.

BRIEF DESCRIPTION OF THE DRAWINGS

The above and further features of the invention are set forth with particularity in the appended claims, and together with advantages thereof will become clearer from the following detailed description of an exemplary embodiment of the invention given with reference to the accompanying drawings.

The invention will be further described below in connection with exemplary embodiments which are schematically shown in the drawings, wherein.

DESCRIPTION OF THE REFERENCE SIGNS

The following reference signs refer to the drawings:
Ref—Item
G—Generator system or subsystem
S—Switchboard, switchboard subsystem
E—Energy storage system or subsystem
T—Thruster Redundancy zones are indicated by enclosure in dashed lines.

DETAILED DESCRIPTION

An underlying principle of a high reliability vessel is that functions are divided into redundancy zones, wherein total loss of one zone should not prevent the vessel from operating, at least within a defined performance envelope that also comprises operational time in a degraded mode. For IMO Class 3 vessels, there is a requirement that loss of a position is not to occur in the event of a single fault in any component or system, including from fire and flooding.

Figure 1:
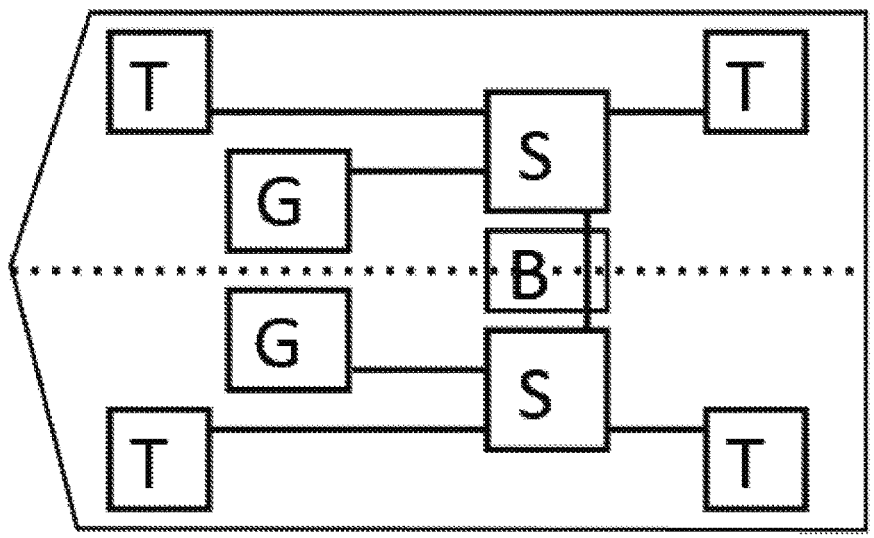
FIG. 1 shows a vessel according to prior art.

For comparison, FIG. 1 shows a vessel according to prior art, wherein the vessel is divided into two redundancy zones by a longitudinal bulkhead. The loss of one side will allow the other side to maintain operations. Single failure criteria comprise:
- any static component or system (generators, thrusters, switchboards, remote controlled valves etc.);
- any normally static component (cables, pipes, manual valves etc.);
- all components in any one watertight compartment, from fire or flooding; and
- all components in any one fire sub-division, from fire or flooding.

It should be noted that, in this design, the switchboard is split into two switchboard subsystems connected with a bus tie. When operating in a redundancy mode, the bus tie is kept open to achieve electrical isolation between the two zones.

A generator system typically comprises at least one engine driving a generator. For redundancy, and/or the ability to deliver sufficient power, the generator system comprises a plurality of engines, each driving a generator. Each generator is in turn connected to the switchboard system.

An underlying principle of the present invention is that when one part is enclosed in a compartment in a redundancy zone, there is actually a second implied redundancy zone defined by the area outside the compartment and within the hull of the ship. Throughout this disclosure, a redundancy zone means an enclosed area unless otherwise stated. Nevertheless, the implied redundancy zone should always be kept in mind for failure mode analysis.

Figure 2:
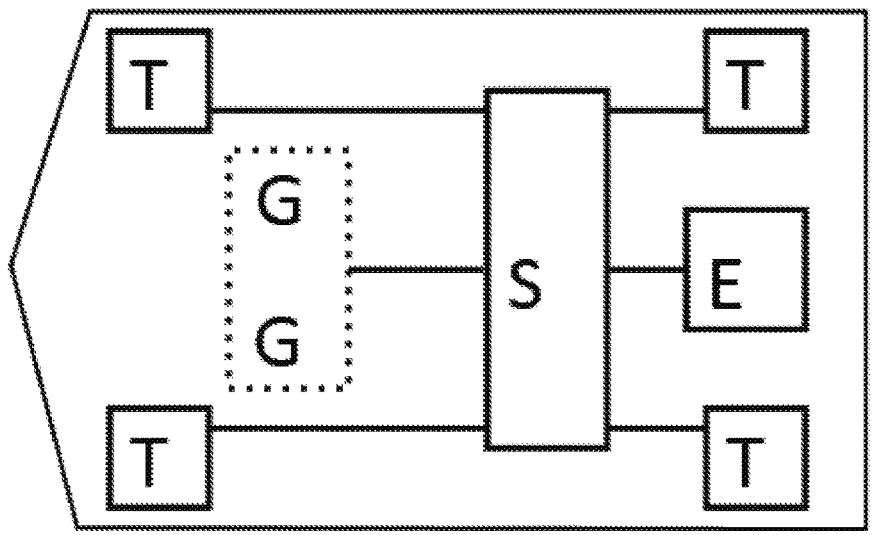
FIG. 2 shows a vessel wherein a generator system is enclosed in a redundancy zone.
Figure 3:
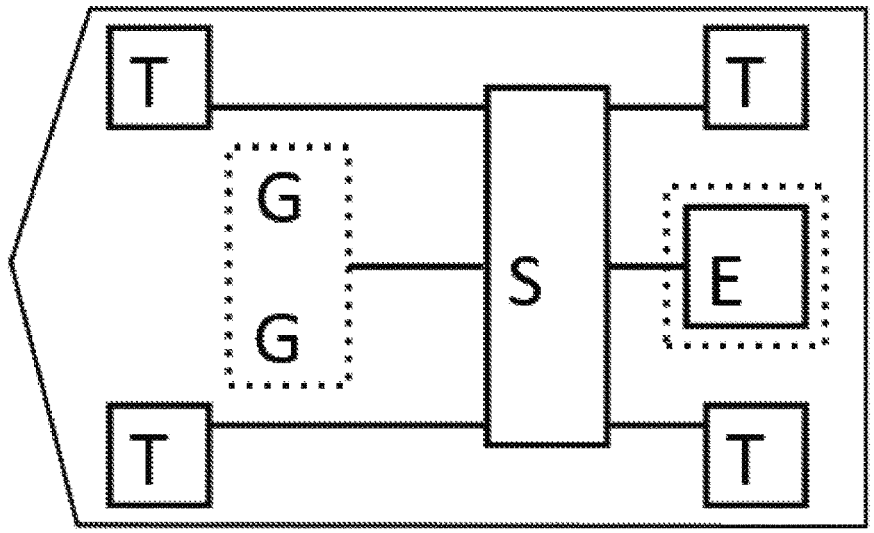
FIG. 3 shows a vessel wherein a generator system and an energy storage system are enclosed in separate redundancy zones.

FIG. 2 shows a vessel wherein a generator system is enclosed in a redundancy zone. It should be noted that placing an energy storage system in a redundancy zone is also within the ambit of this basic embodiment, as is having both parts, i.e. the generator system and the energy storage system, enclosed in separate redundancy zones, as shown in FIG. 3. Should one or the other of such parts be lost, the vessel can draw energy from the part not lost and can operate with all thrusters. This embodiment has some limitations, such that a loss of the implied redundancy zone will lead to the vessel no longer being operational.

Placing the generator system in a single compartment in a redundancy zone has many advantages e.g., fuel, exhaust, cooling and power lines can be kept close together, significantly reducing complexity. The generator system with flammable fuel, high temperature and a high power electric system, represents various failure modes that can result in a loss. A separate energy storage system outside the single engine compartment will overcome such a loss.

The energy storage system represents electrical power at standby, ready to use should the generator system fail. The energy storage system can include a single accumulator or a battery system, or a plurality of accumulators or batteries that are separately fused for improved reliability.

The present invention provides many embodiments for the energy storage system. It is possible to use centralized as well as decentralized energy storage systems. It is found that placing an energy storage system local to all thrusters, wherein the local energy storage system and the respective thruster are compartmentalized together in a redundancy zone, provides a particularly high reliability. In such a system, the worst case single failure is loss of a single thruster which is a significant improvement relative to the loss of half of the power system and half of the thrusters, which is the result in prior art configurations.

FIG. 2 shows such a system wherein each thruster redundancy zone receives power through a switchboard. In a normal mode, the thruster is powered by the generator system providing power through the switchboard. Also, the energy storage system can be recharged or trickle charged and maintained by the same provided power. In case of a power failure, i.e., due to a failure in the generator system, the switchboard or for other reasons, emergency power is fed from the energy storage system into the thruster.

Local power also makes it possible to combine provided power from the generator system, e.g., with a boost of energy from the energy storage system for emergency situations, requiring extra large amounts of power. Having local energy storage makes it simpler to draw extra thick power cables for such peak power.

With local power, it also will be possible to operate thrusters without powering up and operating the entire system.

The switchboard system routes power from the generator system to the thrusters and the energy storage system. In prior art, as shown in FIG. 1, the switchboard system is divided into two subsystems connected with a bus tie. The divided switchboard system with the bus tie represents added complexity that is no longer required according to the present invention for all embodiments.

The present invention allows for many embodiments of the switchboard system. It is possible to use a centralized as well as a decentralized switchboard system.

In the vessels shown in FIG. 2 and FIG. 3, the switchboard system connects to the generator system and also the energy storage system. Thus, the switchboard system has to be able to route power from the generator system to the thrusters, and preferably also be able to route power when charging and receiving power from the energy storage system.

Figure 4:
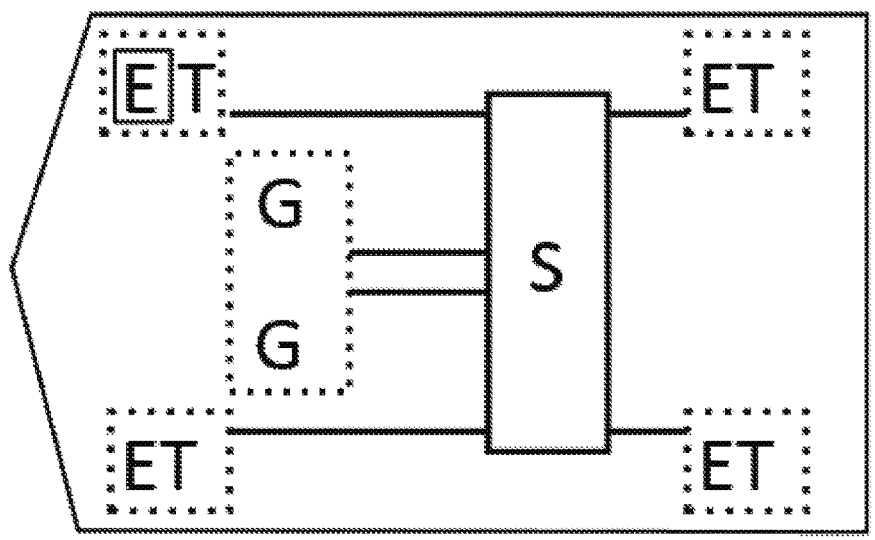
FIG. 4 shows the present invention with local energy storage subsystems, and comprising a switchboard similar to that of prior art, wherein the generator system is located in a redundancy zone.

In the embodiment shown in FIG. 4, the switchboard delivers power for charge and discharge of the energy storage system taking place in the thruster zones.

Figure 5:
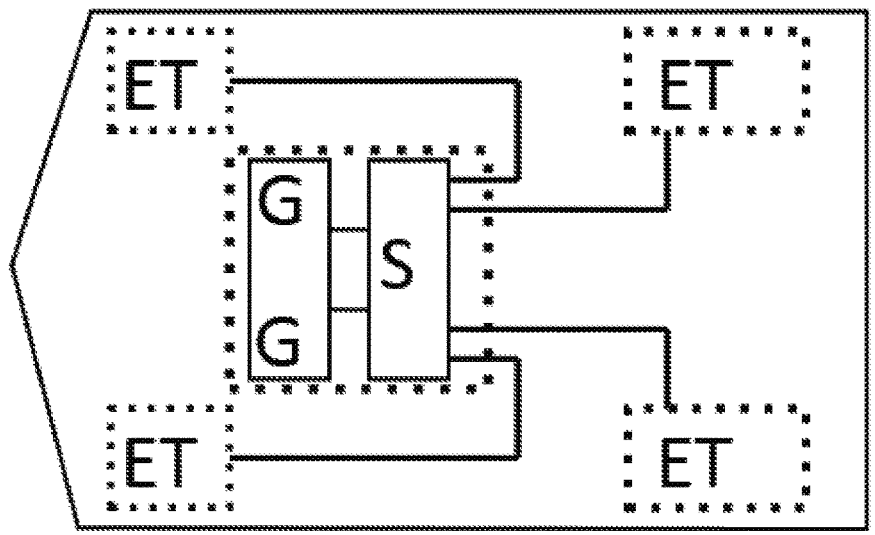
FIG. 5 shows the present invention with local energy storage subsystems without a switchboard.

In the embodiment shown in FIG. 5, the switchboard is distributed between two of the thruster zones. This allows a compact solution for the distribution panel in the thruster zones, but also adds some complexity in that the switchboard subsystems also have to feed another thruster zone. Also, having the switchboard subsystems in redundancy zones can improve availability.

The bus tie makes it possible to connect and disconnect switchboard subsystems in a switchboard system. Under certain operations, such as in an IMO class 3 vessel, it is mandatory to provide an option of disconnecting the switchboard subsystems.

The embodiment of the apparatus according to the invention shown in FIGS. 4 and 5 comprises a single engine room in a redundancy zone and an energy storage subsystem local to each thruster wherein each thruster is in one or more separate redundancy zones together with the respective energy storage subsystem. Thus, any single redundancy zone can fail without loss of operational capability. In fact, a single failure will leave maximum one thruster unavailable, a clear improvement over prior art where one half of the ship can fail. This embodiment can take on further variations.

Figure 7:
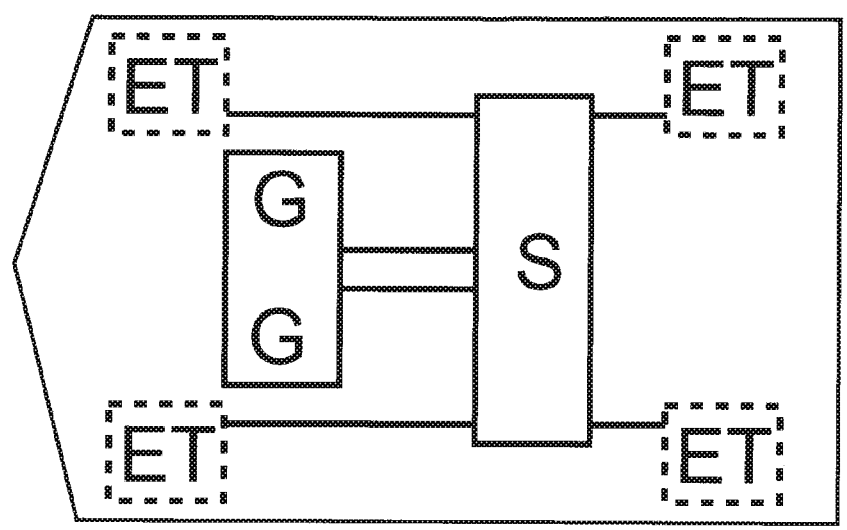
FIG. 7 shows the present invention with local energy storage subsystems and comprising a switchboard similar to that of prior art.

FIG. 4 shows a system comprising a switchboard similar to that of prior art. When the system operates in IMO Class 3 modes, a bus tie inside the switchboard is kept open and each switchboard subsystem is powered separately from the generator system. This has the advantage of operating flexibility between IMO Class 3 modes and a non-IMO Class 3 mode, with lower running costs by operating fewer engines to drive the generators. The system also negates the requirement to have generators capable of providing double the power required for dynamic positioning operations associated with the baseline design in order to have sufficient power available following a single failure. Operating fewer engines at higher load has both fuel consumption and emissions benefits. Generators can be placed in a redundancy zone, as shown in FIG. 4, or not in a separate redundancy zone, as shown in FIG. 7.

FIG. 5 shows an embodiment with a switchboard co-located with the generators, where separate power cables from the single engine room feed each thruster redundancy zone, which is advantageous in view of its simplicity. These modes comply with IMO Class 3 vessel requirements.

It is preferred that the fire-proof sub-divisions are implemented according to the div. A60 standard.

A number of variations on the embodiments described herein can be envisaged. For instance, one can use a hybrid system where the switchboard system is split into switchboard subsystems that are local to at least two thruster redundancy zones.

Figure 6:
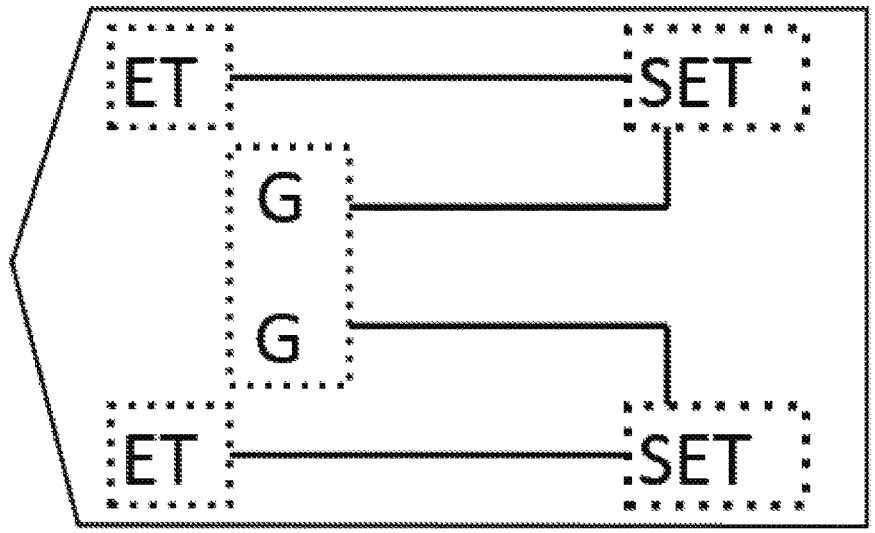
FIG. 6 shows the present invention with local energy storage subsystems and comprising local switchboard subsystems.

FIG. 6 shows such an embodiment, wherein the switchboard subsystems route power from the generator system to the redundancy zone local to the switchboard subsystem as well as to other thruster redundancy zones.

FIGS. 2 and 3 show a single cable from the single engine room and from the energy storage unit. Nevertheless, one can also contemplate or envisage a system where there are two cables from the engine room and two cables from the energy storage unit, instead of a single cable from a single engine room and a single cable from the energy storage unit. In such an arrangement, a first cable from a first group of engines and a first cable from a first part of the energy storage system are connected to a first switchboard subsystem, and a second cable from a second group of engines and a second cable from a second part of the energy storage system are connected to a second switchboard subsystem. A bus tie can be provided to selectively connect the first and second switchboard subsystems.

It is also within the scope of the invention to provide a thruster in the single engine compartment embodiment. Furthermore, a thruster may be provided in this single engine compartment when the single engine compartment is a redundancy zone.

It is also possible to provide a redundancy zone having an energy storage unit and a thruster that further comprises a sub-division between the energy storage system and the thruster. Such a sub-division can be provided to avoid mixing of fumes, or to provide an extra barrier against fire or flooding. Such divided compartments still provide the same effect as a normal redundancy zone, and thus still fall within the ambit of the invention.

The present invention finds use in high reliability vessels with improved capability, in the event of single and multiple points of failure.

The invention claimed is:

1. A dynamic positioning vessel including:
   a plurality of redundancy zones, wherein each redundancy zone is in a separate enclosed area,
   a thruster system comprising at least two thrusters to create transversal thrust, and
   a main power supply system that includes:
      a generator system, and
      a main electrical distribution system including a switchboard system, wherein
the vessel further comprises an energy storage system comprising a plurality of energy storage subsystems, wherein at least one of the thrusters is operatively connected to a first of the plurality of energy storage subsystems, and the at least one of the thrusters and the operatively connected energy storage subsystem are located in a first redundancy zone of the plurality of redundancy zones, and another of the thrusters and the generator system are located outside said first redundancy zone.

2. The dynamic positioning vessel according to claim 1, wherein the generator system is located in a single compartment.

3. The dynamic positioning vessel according to claim 2, wherein the generator system is located in a single redundancy zone.

4. The dynamic positioning vessel according to claim 1, wherein the first redundancy zone comprises a sub-division between the first energy storage subsystem and the at least one thruster.

5. Use of a dynamic positioning vessel according to claim 4, wherein the vessel is operated according to the International Maritime Organization (IMO) Class 3 standards for dynamic positioning vessels.

6. The dynamic positioning vessel according to claim 1, wherein an energy storage subsystem is located locally to all thrusters.

7. Use of a dynamic positioning vessel according to claim 6, wherein the vessel is operated according to the International Maritime Organization (IMO) Class 3 standards for dynamic positioning vessels.

8. The dynamic positioning vessel according to claim 1, wherein each thruster is in a separate redundancy zone, of the plurality of redundancy zones, together with a respective energy storage subsystem.

9. Use of a dynamic positioning vessel according to claim 8, wherein the vessel is operated according to the International Maritime Organization (IMO) Class 3 standards for dynamic positioning vessels.

10. The dynamic positioning vessel according to claim 1, wherein the switchboard system is centralized.

11. The dynamic positioning vessel according to claim 10, wherein the switchboard system is centralized in a redundancy zone.

12. The dynamic positioning vessel according to claim 1, wherein the switchboard system comprises a plurality of switchboard subsystems and is decentralized.

13. The dynamic positioning vessel according to claim 12, wherein the switchboard system is located locally to at least one thruster of the thrusters.

14. Use of a dynamic positioning vessel according to claim 13, wherein the vessel is operated according to the International Maritime Organization (IMO) Class 3 standards for dynamic positioning vessels.

15. The dynamic positioning vessel according to claim 12, wherein the switchboard system is located locally to at least one the energy storage system.

16. Use of a dynamic positioning vessel according to claim 15, wherein the vessel is operated according to the International Maritime Organization (IMO) Class 3 standards for dynamic positioning vessels.

17. The dynamic positioning vessel according to claim 1, wherein at least one of the redundancy zones is implemented according to standard fire protection zone div. A60.

18. Use of a dynamic positioning vessel according to claim 17, wherein the vessel is operated according to the International Maritime Organization (IMO) Class 3 standards for dynamic positioning vessels.

19. Use of a dynamic positioning vessel according to claim 1, wherein the vessel is operated according to the International Maritime Organization (IMO) Class 3 standards for dynamic positioning vessels.

* * * * *